US005571980A

United States Patent [19]

Busley

[11] Patent Number: 5,571,980

[45] Date of Patent: Nov. 5, 1996

[54] MULTIPLE FINGERBOARD INSTRUMENT STRUCTURES

[76] Inventor: Bradford M. Busley, 384 S. Ironton St. #413, Aurora, Colo. 80012

[21] Appl. No.: 832,997

[22] Filed: Feb. 10, 1992

Related U.S. Application Data

[63] Continuation-in-part of Ser. No. 466,022, Jan. 17, 1990, abandoned.

[51] Int. Cl.[6] ................................ G01D 1/00; G01D 3/00

[52] U.S. Cl. ................................ 84/263; 84/267; 84/291; 84/453

[58] Field of Search .............................. 84/263, 267, 268, 84/269, 291, 293, 453

[56] References Cited

U.S. PATENT DOCUMENTS 4,240,319 12/1980 Soupios ..................................... 84/263
4,785,705 11/1988 Patterson .................................. 84/263
4,953,434 9/1990 Guss ........................................ 84/263

*Primary Examiner*—Michael L. Gellner
*Assistant Examiner*—Cassandra Spyrou

[57] ABSTRACT

The present invention integrates multiple single fingerboard instrument structures together by means of a linkage into a composite multiple fingerboard musical instrument that dimensionally positions instrument fingerboards horizontally, vertically and angularly relative to each other as a means for providing the player with the most beneficial structural configuration for simultaneous engagement by the hands on separate fingerboards. A variety of novel structures, linkages, and fingerboard matrix arrays are presented.

8 Claims, 7 Drawing Sheets

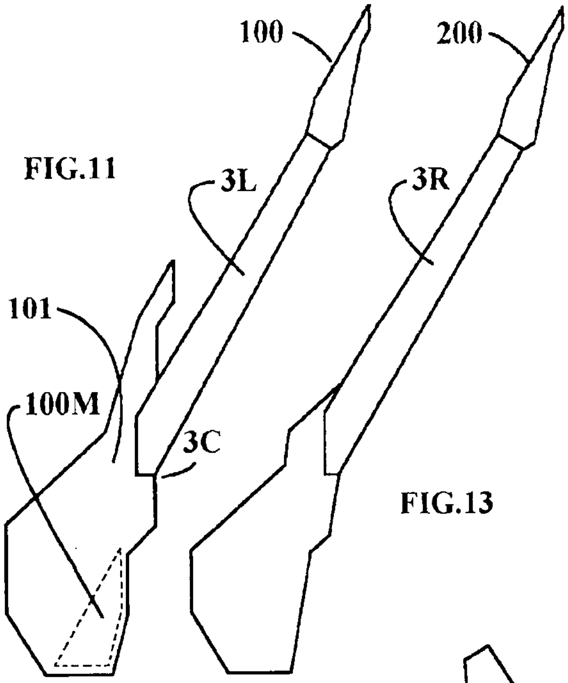
FIG.11
FIG.13
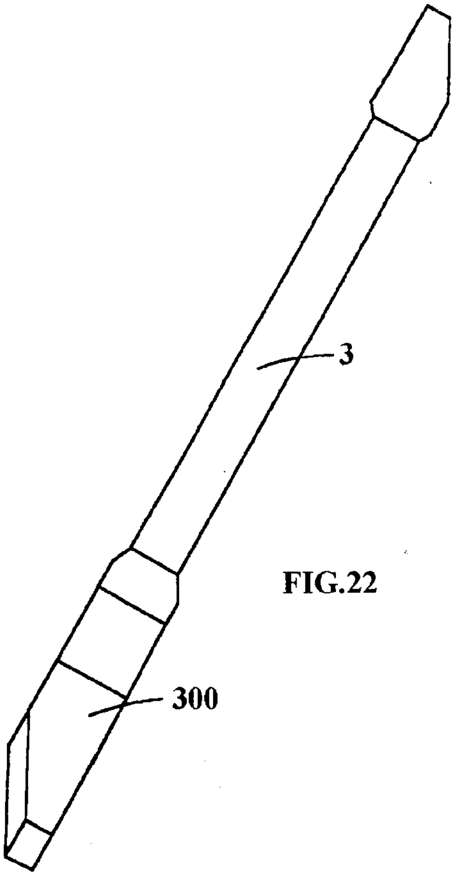
FIG.22
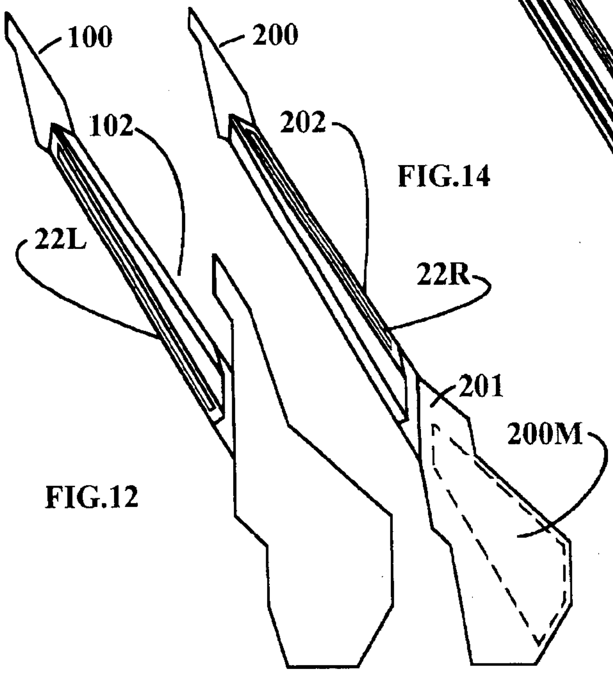
FIG.12
FIG.14
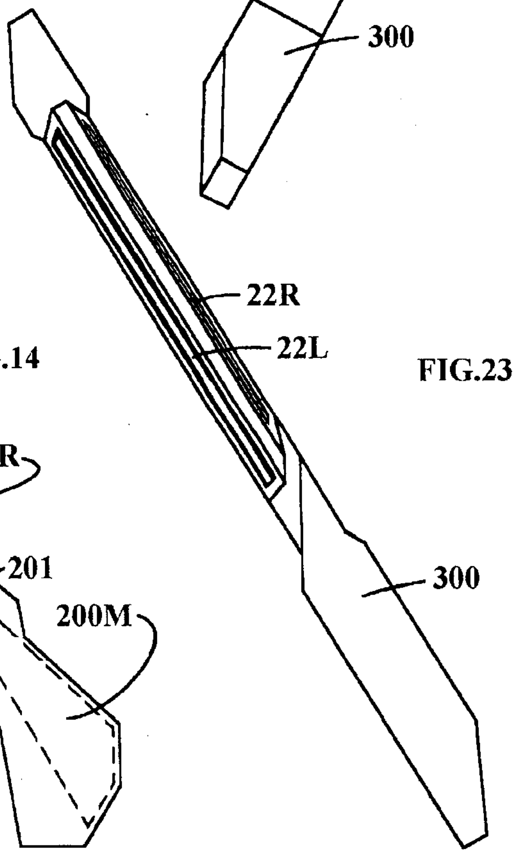
FIG.23

MULTIPLE FINGERBOARD INSTRUMENT STRUCTURES

This is a continuation-in-part of Ser. No. 07/466,022, filed, 1990, Jan. 17, abandoned.

FIELD OF THE INVENTION

This invention relates to musical instruments with fingerboards and specifically to synthesizer and string instrument fingerboard technologies, ergonomic structural configurations of multiple fingerboard musical instruments and to linkages that connect single fingerboard instruments together into composite multiple fingerboard musical instruments.

THE PRIOR ART

A wide variety of finger engagable switching, position sensing and pressure sensing technologies are presently integrated into fingerboard designs and depending upon their nature, they may intrinsically produce musical sound and/or function as a means for dynamically engaging the circuitries of electronic devices such as synthesizers, computers, and signal effects processing equiptment. These technologies inherently include within their structuring a finger engagable contact surface that provides the means for player interface and device engagement. With fingerboards, the chosen technology is commonly used in multiples wherein the finger engagable contact surfaces of multiple devices are configured into a row-and-column matrix array on the engaging face of the fingerboard. Depending upon the technology used, a finger engagable contact surface may correspond to: the engaging face of an independent finger engagable switching means; to a position on the engaging face of a finger engagable position sensing means; to the engaging face of a combination independent finger engagable switching and independent pressure sensing means; to the engaging face of and a position on the engaging face of a combination individual finger engagable switching means and group pressure sensing means; to a position on the engaging face of a combination finger engagable position and pressure sensing means; to the contact point between a string and fret; and to the contact point between a string and the surface of a fingerboard.

The following patents illustrate a few examples of the diversity of switching, position and pressure sensing means found within the art for providing the player with dynamic control over synthesizer, computer and/or signal effects processing electronics in a fingerboard format adaptable to the present invention and they include: U.S. Pat. No. 3,196,729 to Burns et al relative to selector switching means responsive to the fingering of strings against a fingerboard; U.S. Pat. No. 3,340,343 to Woll relative to key switch actuators; U.S. Pat. No. 3,482,028 to Cox et al relative to switching contacts; U.S. Pat. No. 3,482,029 to Sines relative to fret switches; U.S. Pat. No. 3,530,226 to Wheeler et al relative to push buttons; U.S. Pat. No. 3,555,166 to Gasser relative to key-actuated switches; U.S. Pat. No. 3,666,875 to Ranzato relative to elongated actuating buttons; U.S. Pat. No. 3,694,559 to Suzuki et al relative to variable resistor fingerboards; U.S. Pat. No. 3,712,952 to Terlinde relative to segmented fret switches; U.S. Pat. No. 3,742,114 to Barkan relative to resistance strips; Re. 31,019 to Evangelista relative to actuator blade switches; U.S. Pat. No. 3,902,395 to Avant relative to multiplexing strings and electrically conductive fingerpads; U.S. Pat. No. 4,306,480 to Eventoff relative to conductive frets, capacitance switches, optical switches, piezo-resistive elements and force sensitive diodes; U.S. Pat. No. 4,339,979 to Norman relative to capacitance touch pads; U.S. Pat. No. 4,580,479 to Bonanno relative to pressure-resistance switches; U.S. Pat. No. 4,630,520 to Bonanno relative to high impedance buffering and a variety of optical, capacitive and conductive rubber neck pressure sensors; U.S. Pat. No. 4,653,376 to Allured et al relative to fret/string multiplexing; U.S. Pat. No. 4,723,468 to Takabayashi et al relative to strings using sonar as a means for fingerboard position determination; U.S. Pat. No. 4,748,887 to Marshall relative to segmented frets; U.S. Pat. No. 4,760,767 to Tsurubuchi relative to a finger position detection apparatus; U.S. Pat. No. 4,823,667 to Deutsch relative to Fourier transform; and U.S. Pat. No. 4,953,439 to Newell relative to quantized resistance strings.

From the foregoing references, it can be appreciated that with the proper structuring, many types of finger engagable switching, position sensing and pressure sensing devices are capable of being integrated into a fingerboard format and that a wide variety of electronic processing formats are available for such devices. It can also be appreciated that many subsequently developed finger engagable switching, position and pressure sensing technologies will be viable for integration into a fingerboard format. Unfortunately, no synthesizer, remote synthesizer controller or MIDI controller has been found that includes multiple fingerboards in a structure that is comfortable to engage, provides each hand with greater musical and control capabilities than do keyboard type controllers and provides the player with a diversity of technologies, tactile responses and control capabilities from which to select.

A wide variety of instruments with multiple string fingerboards are found within the art. These instruments exist in both rigid and variable structural formats and all have been found to be deficient in regards to ergonomic design for optimum player interface during independent play by each hand on a separate fingerboard.

In 1952, the William J. Smith Music Publishing Co. located in New York, N.Y. published a technique book by Jimmie Webster entitled "Touch System for Electric and Amplified Spanish Guitar." This is the first known technique book written and published specifically for the development of independent play string techniques. U.S. Pat. No. 2,989,884 of Bunker, discloses an adjustable string dampening system for a rigid instrument structure with two fingerboards that is especially adapted to expand the independent play string techniques tought by Jimmie Webster as told to the inventor by Mr. Bunker. The configuration of this instrument places the engaging faces of the fingerboards in the same plane using a parallel longitudinal relationship with a lateral offset. With this instrument, the right hand is positioned parallel to and above the strings of neck 11. Parallel engagement positioning of the fingers and thumb with lute-type fingerboard instruments has been found to be limiting because it is inherently restrictive to agility. With this positioning, the thumb, index and middle fingers are the primary engagement digits and they must use highly divergent position orientations relative to each other for the best possible engagement. As illustrated, the instrument structure attempts to compensate for the inherent problems of parallel string engagement with the inclusion of cover member 16 which provides support for the right arm, neck 11 with increased width and string spacings to accommodate the fingers and frets 21' are angularly positioned to make engagement easier as the player moves across the fingerboard. Even with these structural variations, successive melodic engagement of adjacent strings may require the usage of the same finger which restricts legato, arpeggios are limited to certain patterns, finger positioning and engagement for certain chord inversions is awkward and chord voicings are limited to several notes due to the minimal engagement capabilities of the ring and little fingers. Also, parallel string engagement restricts the ability of a player to engage thumb controlled expressive devices during play which is of major consideration. The fingers of the left hand engage the strings of neck 12 from a substantially perpendicular string engagement positioning and do not experience these technique restrictions.

Another rigid instrument structure with two fingerboards adapted for independent play is found in Soupios, U.S. Pat. No. 4,240,319. The configuration of this instrument places the engaging faces of the fingerboards in a parallel longitudinal relationship with a lateral offset and vertically displaces the fingerboards relative to each other while maintaining the same horizonal orientation. Parallel fingerboards in three dimensions have proven to be limiting because this type of structure forces the body to engage a shape that is contrary to the natural motions of the body. With this structure, the minimal vertical displacement of neck 20 above neck 10 provides for better access of the right hand. However, because neck 20 uses the same horizonal orientation as neck 10, engagement positioning of the wrist, elbow, arm and shoulder is highly variable relative to fingerboard frequency range. This provides for an inconsistent technique that is awkward and uncomfortable to engage and in combination with the awkward body positioning required for clear visualization of the fingerboards, this structural format has proven to be a hindrance to good posture, technique engagement and player comfort.

The teachings in Patterson, U.S. Pat. No. 4,785,705, describes a flexible strap connecting means that attaches two independent instrument structures together and provides for easy neck replacement. The configuration of this instrument substantially places the engaging faces of the fingerboards in the same vertical plane using a parallel longitudinal relationship with no lateral offset. This instrument is primarily designed for engagement by both hands on the same neck using dependent play string techniques. The inability of this invention to substantially displace the necks laterally, vertically and angularly relative to each other and rigidly maintain such a configuration makes this instrument undesirable for the engagement of independent play string techniques by each hand on its own fingerboard.

A structurally variable lute-type string instrument with two fingerboards is found in Guss, U.S. Pat. No. 4,953,434. This reference discloses a musical instrument designed for engagement by two musicians using dependent play string techniques that allows each musician to move their respective fingerboards relative to a common vertex and is preferably to be played in a zero gravity environment. Structural variability is accomplished with the usage of a spherical linkage that structurally integrates instrument truss rods together. Mechanically, this is an unbeneficial design in that it exerts dynamic stress upon components designed to provide dimensional stability. In reference to independent play by one musician using both fingerboards simultaneously, this structure is not viable. By attaching the single fingerboard instruments of this invention together at their bottom edges, this instrument's fingerboards are incapable of adjacent dimensional positioning which is highly preferred for this type of technique engagement. Awkward engaging positions, clumsy body motions and visualization restrictions are unavoidable because the structural design of this instrument would require a single musician to stand mesial to the fingerboards and use in-and-out arm motions relative to the sides of the body while attempting to maintain fingerboard positioning. This is an extremely detrimental structural format for simultaneous independent play on separate fingerboards by one musician.

Several references were found for dependent play oriented string fingerboard instruments that attach multiple fingerboards to a common body member by means of a linkage. U.S. Pat. No. 832,157 to Platts and U.S. Pat. No. 4,321,852 to Young in FIG. 2A illustrate two clamping linkages that provide only for horizontal positioning variability. Each instrument uses a horizontal orientation wherein the fingerboards are offset laterally and pivotally relative to each other. These instruments and linkages are very limiting in regards to simultaneous independent play on each fingerboard because the positioning of the fingerboards is inherently restrictive to such technique engagement and their linkages are minimally adjustable relative to horizontal positioning, do not substantially displace the fingerboards vertically due to the usage of a common body member and are planar in design which eliminates angular pitch, bank and yaw variability of fingerboard positioning.

U.S. Pat. No. 3,130,625 to Savona is for a prismatic linkage that allows a player to easily interchange instrument fingerboards. Regarding simultaneous independent play on each fingerboard, this instrument uses a parallel fingerboard format and presents all of the limitations as described above for similar structures. In consideration of the linkage of this instrument, the usage of a common body member in combination with the lack of vertical and angular fingerboard positioning capabilities provides for a linkage design that is incapable of providing the player with a beneficial multiple fingerboard instrument structure for such technique engagement.

The bass viol stand in U.S. Pat. No. 2,502,229 to Miller is an example of a spherical linkage that provides for dimensional positioning of an instrument while supporting its structure in a vertical orientation, but does not provide for height adjustment or for substantial dimensional variability of the structure in an orientation other than vertical.

From the foregoing discussion, it has been shown that a wide variety of finger engagable switching, position sensing and pressure sensing technologies are presently integrated into fingerboard designs and that depending upon their nature, they may intrinsically produce musical sound or function as a means for dynamically engaging the circuitries of electronic devices such as synthesizers, computers, and signal effects processing devices. It has been shown that fingerboards customarily configure the finger engagable contact surfaces of multiple devices into a row-and-column matrix array on the engaging face of the fingerboard and that depending upon the technology used, a finger engagable contact surface may correspond to: the engaging face of an independent finger engagable switching means; to a position on the engaging face of a finger engagable position sensing means; to the engaging face of a combination independent finger engagable switching and independent pressure sensing means; to the engaging face of and a position on the engaging face of a combination individual finger engagable switching means and group pressure sensing means; to a position on the engaging face of a combination finger engagable position and pressure sensing means; to the contact point between a string and fret; and to the contact point between a string and the surface of a fingerboard.

It has been shown that such technological variety provides the player with a diverse choice of tactile responses, instrument capabilities and processing formats from which to select and that it is preferable for a fingerboard technology to provide the player with the capability of dynamically controlling multiple sonic parameters simultaneously from the same finger engagable contact position during independent engagement. It has been shown that many subsequently developed finger engagable switching, position and pressure sensing technologies will be capable of being configured into a fingerboard format.

It can be appreciated that simultaneous engagement by each hand on its own fingerboard is very advantageous to musical expression. It has been shown that synthesizers and MIDI controllers have yet to take advantage of the benefits provided by multiple fingerboard instrument structures and fingerboard technologies that enable a player to simultaneously engage each fingerboard independently. It has been shown that a wide diversity of fixed and variable multiple string fingerboard instruments structures exist and that some have been specially adapted for engagement using independent play string techniques, but that all are deficient in regards to design ergonomics relative to the optimum dimensional positioning for independent engagement by each hand on its own fingerboard and to the means used for providing such structural configurations.

OBJECTS AND ADVANTAGES

Musical expression, technique and the art of musical instrument design find advancement with the design ergonomics, fingerboard technologies and linkages of the present invention.

The primary object of the present invention is to provide the player with a multiple fingerboard musical instrument that horizontally, vertically and angularly positions the fingerboards into a dimensional relationship that is the most advantageous configuration for simultaneous independent play engagement by the hands on separate fingerboards.

A further object of the present invention is to provide the player with a variety of adjustable and non-adjustable player and structurally supported versions of the present invention using novel linkages.

An additional object of the present invention is to provide the player with a variety of preferred fingerboards that use differing technologies, tactile responses and processing formats as a means for advancing a players musical technique, musical expression and musical style.

These and other objects and advantages of the present invention will be apparent to those skilled in the art from the following detailed description, showing the novel construction, combination and elements as herein described, and more particularly defined by the claims, it being understood that changes in the precise embodiments of the disclosed invention are meant to be included as coming within the scope of the claims, except insofar as they may be precluded by the prior art.

BRIEF DESCRIPTION OF THE DRAWINGS

FIG. 11 is a front view illustration of the player supported bodied instrument structure of the present invention and includes reference to the preferred area for linkage mounting.

FIG. 12 is a back view illustration of the player supported bodied instrument structure of the present invention and includes reference to the preferred positioning of the system's manual override controller for the left hand.

FIG. 13 is a front view illustration of the player supported bodiless instrument structure of the present invention.

FIG. 14 is a back view illustration of the player supported bodiless instrument structure of the present invention and includes reference to the preferred area for linkage mounting and the preferred positioning of the system's manual override controller for the right hand.

FIG. 22 is a front view illustration of the structurally supported bodiless instrument structure of the present invention.

FIG. 23 is a back view illustration of the structurally supported version of the present invention and includes reference the preferred positioning of the system's manual override controllers.

DETAILED DESCRIPTION

Figure 1:
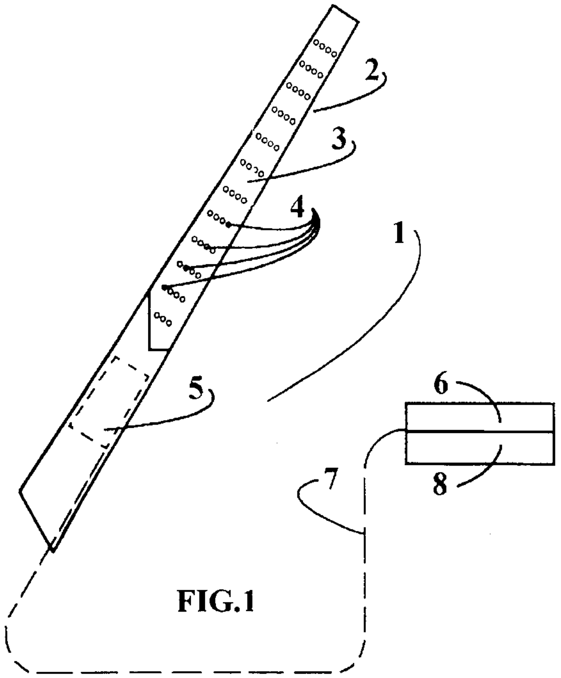
FIG. 1 illustrates a generalized fingerboard system.

Referring now to the drawings in more detail, the same numbers in each figure generally represent the same elements.

FIG. 1 illustrates a perspective front view of a generalized single fingerboard musical instrument system 1 that includes single fingerboard instrument structure 2, fingerboard 3 with finger engagable contact positions 4, onboard instrument electronics 5, offboard instrument electronics 6 information transfer means 7 and audio-visual electronics 8.

Single fingerboard instrument structure 2 provides support for fingerboard 3. Depending upon the design of the instrument, fingerboard 3 may be integral with, fixedly attached to or removably connected with single fingerboard instrument structure 2. Such structural formats are well known to those skilled in the art. Onboard instrument electronics 5 and offboard instrument electronics 6 vary relative to the type of fingerboard technology used, the electronic housing configuration desired and may include all forms of synthesis, computer, string instrument and information control technologies.

Depending upon the chosen combination, instrument electronics may be completely self contained by single fingerboard instrument structure 2 or use a combination of onboard and offboard housing formats with information transfer means 7 providing for system communication. Information transfer means 7 is shown in phantom to illustrate the viability of both hardwired and wireless transmission systems with the present invention. It should be noted that with certain technologies and design formats, fingerboard 3 may contain all onboard instrument electronics. Audio-visual electronics 8 may include all forms of samplers, sequencers, sound processing, sound reinforcement, sound recording and electronically controllable visual devices.

Fingerboard 3 illustrates a generalized fingerboard structure that includes a multiplicity of finger engagable contact surfaces 4 formatted in a standard fingerboard row-and-column matrix array. Depending upon the technology used, each finger engagable contact surface 4 may correspond to: the engaging face of an independent finger engagable switching means; to a position on the engaging face of a finger engagable position sensing means; to the engaging face of a combination independent finger engagable switching and independent pressure sensing means; to the engaging face of and a position on the engaging face of a combination individual finger engagable switching means and group pressure sensing means; to a position on the engaging face of a combination finger engagable position and pressure sensing means; to the contact point between a string and fret; and to the contact point between a string and the surface of a fingerboard.

Figure 2:
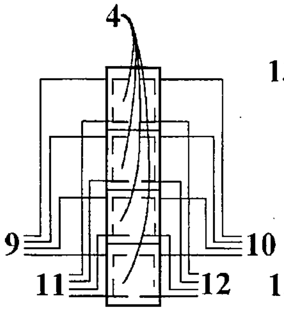
FIG. 2 illustrates the usage of individual switches and combination individual switches and individual pressure sensors as the technology means used for a fingerboard's row-and-column matrix array.

FIG. 2 illustrates a partial column of a fingerboard row-and-column matrix array and represents in block form a multiplicity of individual finger engagable contact surfaces 4 wherein each finger engagable contact surface 4 may be an individual finger engagable switch 9 with individual switch output 10 or a combination individual finger engagable switch and individual finger engagable pressure sensor that includes individual finger engagable switch 9 with individual switch output 10 in combination with individual finger engagable pressure sensor 11 with individual pressure sensor output 12 as illustrated in phantom. A wide variety of fixed and variable position switching and pressure sensing technologies are available for such fingerboard formats and each provides for a unique tactile response.

With the present invention, Force Sensing Resistors, such as those produced by Interlink Electronics, 1110 Mark Avenue, Carpinteria, Calif. 93013, are the preferred means for these fingerboard formats. These devices are light in weight, cost effective, easily configured, have high durability, long functional life, provide for simple structural attachment, provide for touch sensitivity adjustment, provide for variability relative to electronics placement and provide an excellent tactile response while also being a means capable of providing both on-off information and combination on-off and pressure information from the same simple non-mechanical device.

Because each finger engagable contact surface 4 of a fingerboard row-and-column matrix array may be either an individual finger engagable switch or combination individual finger engagable switch and individual finger engagable pressure sensor with this fingerboard format and these technologies, a wide variety of processing formats are available. The following processing formats are preferable for the present invention.

In regards to switch information processing, there are three preferred formats. The first format processes each switch as a separate information source. This format enables a player to engage any combination of switches simultaneously which provides for unlimited chordal combinations. The second is that of a hi-pass column processing format.

With this format, if multiple fingers engage a multiplicity of switches common to a specific column, only the highest engaged switch will provide output information. This processing format simulates the hi-pass response of string fingerboards. The third format is that of a hi-pass/low-pass column processing format wherein if multiple fingers engage a multiplicity of switches common to a specific column, the highest and lowest engaged switches will provide output information. This format provides for an improvement in chordal combinations as compared to the hi-pass format. Selection of switch processing format depends upon the desired capabilities and the number of available oscillators.

Regarding pressure sensor information processing, information from these devices may use the individual, hi-pass or hi-pass/low-pass processing formats as described above. It should be noted that the switches and pressure sensors may use different processing formats with choice being dependent upon desired capabilities.

Figure 3:
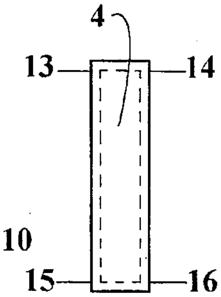
FIG. 3 illustrates the usage of a strip position sensor and combination strip position sensor and strip pressure sensor as the technology means used for each column of a fingerboard's row-and-column matrix array.

FIG. 3 illustrates a partial fingerboard matrix array column using a finger engagable position sensor strip 13 with position sensor strip output 14 and phantomly illustrates finger engagable pressure sensor strip 15 and pressure sensor strip output 16. With this format, each column of a fingerboard's row-and-column matrix array is a separate individual position sensor or combination position and pressure sensor. Position sensors typically provide on-off switching information in combination with surface information. As can be appreciated, each finger engagable contact position 4 may correspond to a specific position on the engaging face of a finger engagable switching means, to a specific position on the engaging face of a finger engagable position sensing means and to a specific position on the engaging face of a finger engagable pressure sensing means.

FSRs configured into strips provide the means for producing on-off switching, on-off switching and position sensing information and on-off switching, position and pressure sensing information from the same device and are therefore the preferred technology for this fingerboard style. There are two preferred processing formats. The first format provides the player with the means for dynamically controlling oscillator frequencies relative to finger positioning and simulates the frequency control provided by fretless string fingerboards. With this technology, the position information provided by each strip is inherently continuous in nature. When interfaced with a variable oscillator, the means is provided for continuous frequency response control relative to finger position thereby effectively simulating the frequency response of fretless fingerboards. With the second processing format, the output information from each strip is effectively segmented relative to signal intensity wherein a variable signal intensity within a certain predetermined range will be processed as a discrete switching source thereby simulating the usage of multiple discrete switches per column. It should be noted that each strip is viable only for monophonic play because degeneracies occur in position measurement when multiple points are engaged with this technology formatted in this manner.

Figure 4:
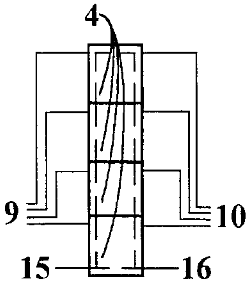
FIG. 4 illustrates the usage of individual switches used in combination with a strip pressure sensor as the technology means used for each column of a fingerboard's row-and-column matrix array.

The illustration of FIG. 4 is that of a partial fingerboard matrix array column using a multiplicity of independent finger engagable switches 9 with individual switch outputs 10 in combination with a common finger engagable pressure sensor strip 15 withpressure sensor strip output 16. With standard technologies, the inclusion of a common pressure sensor provides the means for simplifying pressure information relative to multiple engagement positions. With the preferred usage of FSR pads and an FSR strip occupying the same column, the player is provided the means for both discrete and continuous control of oscillator frequencies incombination with pressure sensing information for the control of processing circuitries from the same source using all of the above described processing formats. At any one time, information should be processed only from either the switches or the strip for frequency control information and pressure sensing information.

Figure 5:
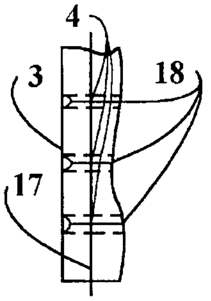
FIG. 5 illustrates a partial column of a fingerboard using string technologies and the respective finger engagable contact surfaces provided by this technology means.

FIG. 5 illustrates a partial column of string fingerboard that includes fingerboard 3, strings 17 and phantomly illustrates frets 18 to represent both fretless fingerboards and fingerboards with frets. As can be appreciated, finger engagable contact surfaces 4 may correspond to either the contact point between a string and fret or to the contact point between a string and the surface of a fingerboard. Essentially, a string is a elongated flexible cylinder with an infinite finger engagable contact surface. When a string is used in combination with a fingerboard without frets, an individual combination switch, position and pressure sensing technology with infinite position sensing capabilities is provided. When a string is used in combination with a fingerboard with frets, an individual combination, switch, position and pressure sensing technology with discrete position sensing capabilities is provided. In regards to pressure sensing, bending a string away from its' nominal engaged position during play essentially provides for a pressure sensor that is a force-to-frequency converter.

Figures 6, 7, 8, 9, 10:
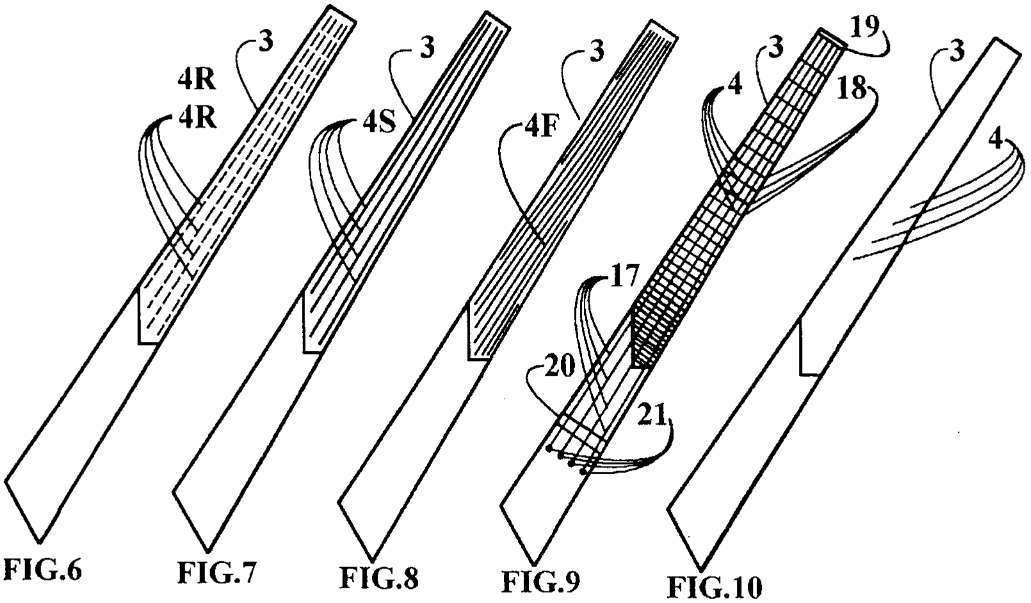
FIG. 6 illustrates a complete fingerboard row-and-column matrix array with rectangular finger engagable contact surfaces that use either individual switches or combination individual switches and individual pressure sensors as the technology means.
FIG. 7 illustrates a complete fingerboard row-and-column matrix array wherein each column uses either and individual strip position sensor, a combination individual strip position sensor and individual strip pressure sensor or a multiplicity of switches used incombination with an individual strip pressure sensor as the technology means.
FIG. 8 illustrates a fingerboard that uses a single strip combination position and pressure sensor as the technology means.
FIG. 9 illustrates a complete fingerboard row-and-column matrix array using string technologies.
FIG. 10 illustrates a blank fingerboard as reference to all existing and subsequently developed fingerboard technologies.

The following figures illustrate complete fingerboard matrix arrays. FIG. 6 illustrates a fingerboard matrix array that provides an individual finger engagable switch or combination individual finger engagable switch and individual finger engagable pressure sensor for each finger engagable contact surface as illustrated by finger engagable contact positions 4R of fingerboard 3. Rectangular configurations are preferred for all fixed position switching and pressure sensing technologies because they provide for the best technique response relative to the greatest matrix array density. Depending upon the tactile feel desired, the engaging face of the switching or combination switching and pressure sensing technology implemented may be embossed with differing textures and may be flush with the surface of the fingerboard, be elevated above the surface of the fingerboard, be recessed within the fingerboard or use a combination of the above structuring formats for the enhancement of technique engagement by providing the player with positional information relative to tactile response.

The preferred fingerboard matrices for the present invention using a multiplicity of individual FSRs per column are 7-by-36, 9-by-48 and 12-by-48. Also, frequency response relative to the finger engagable contact surfaces of a fingerboard's row-and-column matrix array preferably simulate a tuning format wherein the finger engagable contact surfaces 4 of a common row of a fingerboard row-and-column matrix array differ by a perfect fourth relative to each other.

The illustration of FIG. 7 shows three versions of fingerboard 3 wherein each finger engagable contact strip 4S represents an elongated finger engagable position sensor, a combination finger engagable elongated position and pressure sensor or a multiplicity of finger engagable switches used incombination with a common elongated finger engagable pressure sensor. With the surface sensor versions, the lowest finger engagable contact position of each strip is preferably preset to a different oscillator frequency wherein the lowest finger engagable contact position of each strip is tuned a perfect fourth relative to the next adjacent strip. With the switch version, the lowest finger engagable contact surface of each column is preferably tuned a perfect fourth relative to the next adjacent column as described above. A matrix array with seven strips is preferred.

FIG. 8 illustrates fingerboard 3 wherein one fingerboard size FSR strip is integrated. This format provides the player with infinite fingerboard motion for continuously variable oscillator frequency control while enabling the player to control synthesizer signal processing circuits with variable finger pressures. With the preferred format, oscillator frequency increases as the player moves up or across the fingerboard, similar to the frequency increase format of string fingerboards. However, since the player is not limited to specific fingerboard engaging positions, the player may freely engage the entire fingerboard. Each frequency line 4F represents the positions from which a specific tone can be engaged using this preferred format. This fingerboard is viable only for monophonic play. This fingerboard essentially enables a player to freely draw melodic lines. It can be considered to be a planar string.

FIG. 9 illustrates a complete string fingerboard that includes strings 17, frets 18, nut 19, bridge 20 and machine heads 21. Nut 19 and bridge 20 support strings 17 above fingerboard 3 with machine heads 22 controlling string tensions for frequency adjustability. With this illustration, this generalized string fingerboard example is symbolic of all viable string fingerboard technologies found within the art and others yet to be developed that are adaptable to the present invention. The preferred fingerboard matrix arrays for the string versions of the present invention are bass, guitar, 7×36, 9×36 and 14×36 string matrix arrays.

FIG. 10 blankly illustrates fingerboard 3. This reference is included to illustrate the viability of all present art fingerboard technologies that use switches, position sensors and pressure sensors and also to represent any other currently known or subsequently developed switching, position and pressure sensing technologies that will provide the present invention with beneficial fingerboards.

The player supported versions of the present invention preferably combine a bodied instrument structure with a bodiless instrument structure by means of a linkage. Any of the above described preferred fingerboard technologies and fingerboard art references are interfacable with these instrument structures and are therefore generally represented as fingerboards 3R and 3L. Preferably, similar fingerboard types are used with the present invention.

FIGS. 11 and 12 illustrate front and back views respectively of bodied instrument structure 100 that is primarily engaged by the player's left hand and includes fingerboard 3L, mounting surface 100M located on front structural face 101 in a position generally situated longitudinally east and latitudinally south of fingerboard corner 3C and manual override controller 22L with positioning along the bottom half of structural neck 102. FIGS. 13 and 14 illustrate front and back views respectively of bodiless instrument structure 200 that is primarily engaged by the player's right hand and includes fingerboard 3R, mounting surface 200M located on back structural face 201 in a position generally situated latitudinally south and longitudinally relative to the bottom width of fingerboard 3R and manual override controller 22R with positioning along the top quarter of structural neck 202. The difference between a bodied and a bodiless instrument, as illustrated, is a bodied instrument includes a horn which is not included in a bodiless instrument. The preferred technology for manual override controllers 22R and 22L is that of FSR strips dedicated to pressure sensing. Each manual override controller is engaged by means of variable thumb pressure, is positioned to provide the best engagement relative to the engaging hand and is accessible from any fingerboard position.

The following figures illustrate a variety of rigid, prismatic, cylindrical and spherical linkages used alone and in combination that provide the means for combining bodied instrument structure 100 with bodiless instrument structure 200 and horizontally, vertically and angularly positioning fingerboards 3R and 3L relative to each other for an improvement in technique and player comfort. It is well known that rigid linkages provide zero degrees of freedom of motion, prismatic linkages provide one degree of freedom of motion, cylindrical linkages provide two degrees of freedom of motion and that spherical linkages provide three degrees of freedom of motion.

Figure 15:
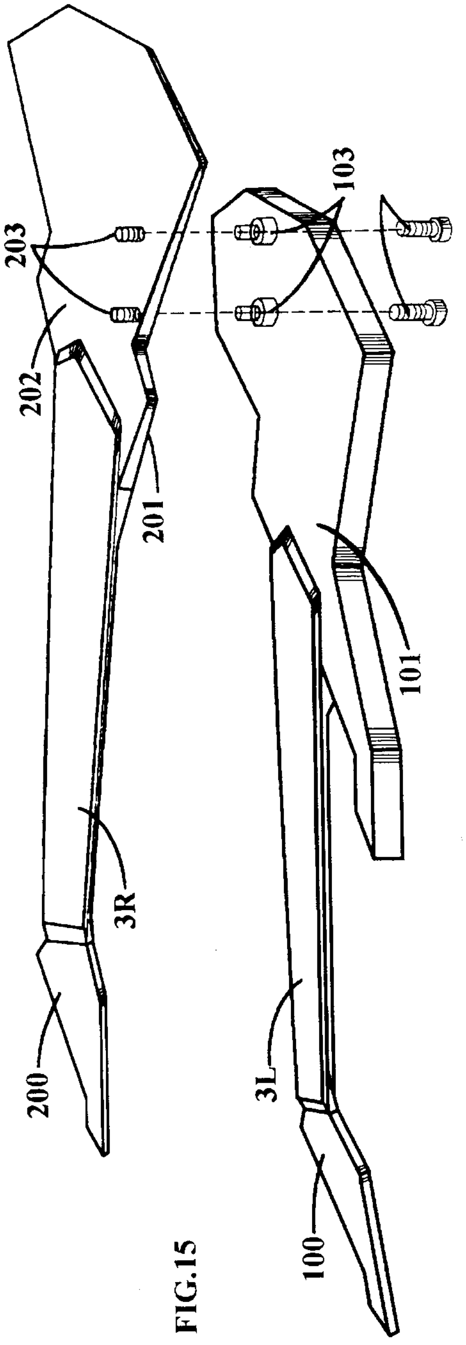
FIG. 15 illustrates in perspective explosion a rigid player supported version of the present invention that uses body structuring as the means for providing horizontal, vertical and angular positioning of instrument fingerboards relative to each other.

FIG. 15 illustrates a rigid linkage format that uses body structuring as the means of providing horizontal, vertical and angular positioning of fingerboards 3R and 3L relative to each other. With this linkage, back structural face 201 of bodiless instrument structure 200 is cut angular in relation to front structural face 202. This angular cut determines the pitch and bank of fingerboard 3R relative to 3L. Yaw, longitudinal and latitudinal positioning of fingerboard 3R relative to 3L is determined by the offset angular orientation of attachment through holes 103 relative to the length of fingerboard 3L and to the perpendicular longitudinal and latitudinal positioning of thread holes 203 on back structural face 201 of bodiless instrument structure 200 relative to the width of fingerboard 3R. For structural linkage, attachment bolts 104 slip fit within attachment through holes 103 and secure with attachment thread holes 203. With this format, each instrument structure intrinsically provides a mounting surface that is a sectional portion of a structural face. When these two mounting surfaces are used in conjunction with a securing means, a rigid linkage that is simple in design and provides all of the benefits of the present invention in a fixed dimensional format is achieved.

Figure 16:
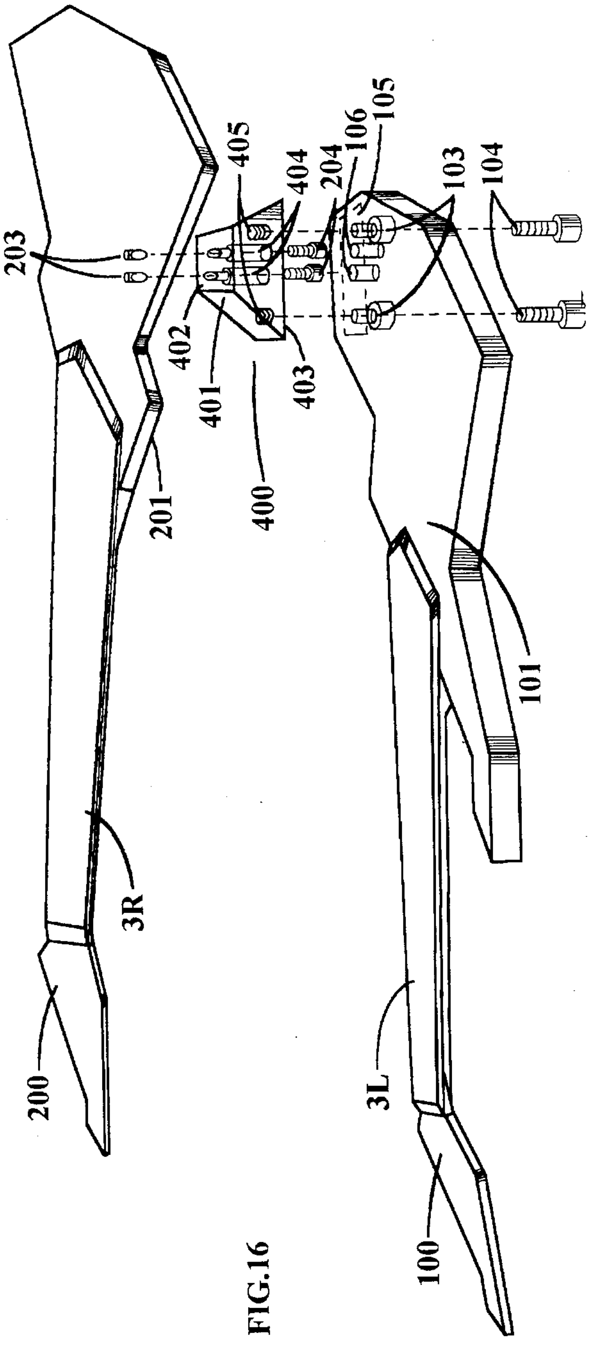
FIG. 16 illustrates in perspective explosion, player supported versions of the present invention that use rigid integral and removable block linkages that provide for the horizontal, vertical and angular positioning of instrument fingerboards relative to each other.

FIG. 16 illustrates fixed integral and removably detachable versions of rigid linkage 400 wherein rigid linkage 400 provides additional vertical displacement of fingerboard 3R above fingerboard 3L. With the removably detachable version of this linkage, block 401 includes angular attachment face 402, attachment face 403, attachment through holes 404 and attachment thread holes 405 and secures to bodied instrument structure 100 and bodiless instrument structure 200 by means of attachment through holes 103, attachment bolts 104, attachment thread holes 203 and attachment bolts 204. Angular attachment face 402 and attachment face 403 are in opposition to each other and are angular in relation. Attachment through holes 103 and attachment thread holes 405 are aligned parallel to the length of fingerboard 3L, attachment through holes 404 are angularly aligned relative to attachment thread holes 405 and attachment thread holes 203 are aligned perpendicular to the width of fingerboard 3R. When secured, this linkage provides for the horizontal, vertical and angular pitch, bank and yaw positioning of fingerboards 3R and 3L relative to each other.

With the fixed integral version of linkage 400, block 401 is structurally integrated with bodied instrument structure 100. Attachment face 403 may be either fixedly secured to front structural face 101 by means of an adhesive or front structural face 101 of bodied instrument structure 100 may be contoured to intrinsically include angular attachment face 402 as a part of its structuring in the form of an elevated plane that is angular in relation to and projects above the front structural face of fingerboard 3L. Phantom area 105 is used to represent these two methods for integrating block 401 with bodied instrument structure 100 and through holes 106 provide the means for removably attaching bodiless instrument structure 200 using this format.

Figure 17:
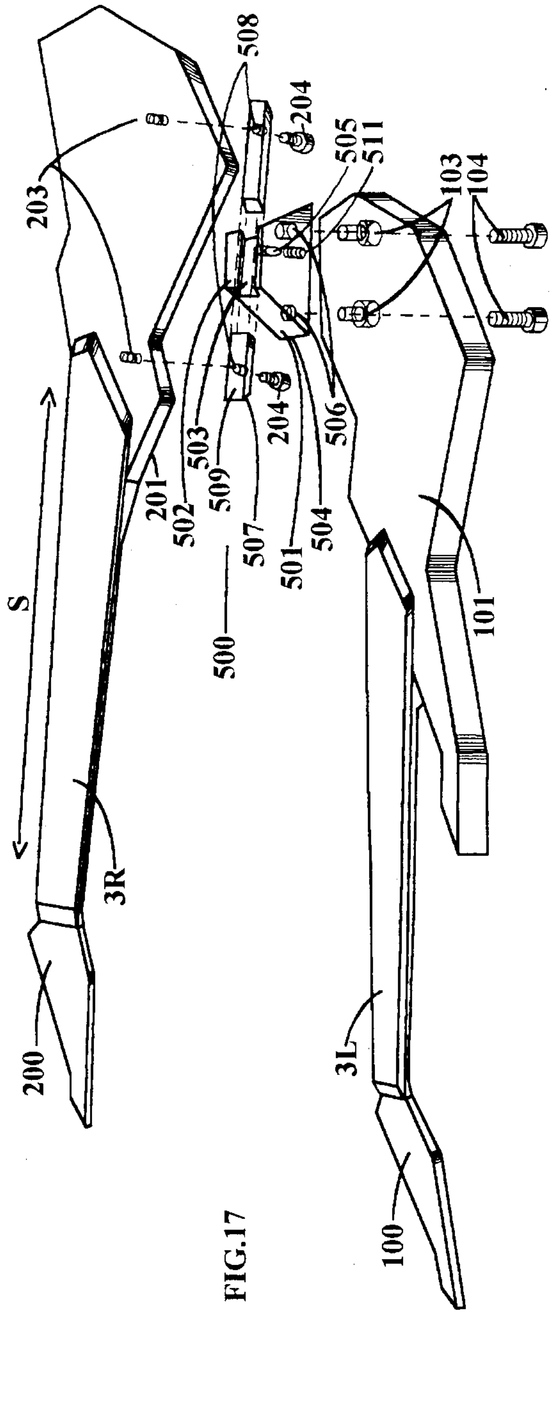
FIG. 17 illustrates in perspective explosion a player supported version of the present invention that uses a prismatic linkage to horizontally, vertically and angularly position instrument fingerboards relative to each other and provide for the variable latitudinal positioning of instrument fingerboards.

FIG. 17 illustrates prismatic linkage 500 that includes prismatic linkage block 501 with angular face 502, prismatic channel 503, attachment face 504, set screw thread hole 505 and attachment thread holes 506, prismatic slider 507 with attachment through holes 508 and prismatic slider attachment face 509, prismatic slider attachment bolts 510 and set screw 511. Attachment face 504 of prismatic linkage block 501 is secured to front structural face 101 of bodied instrument structure 100 by means of through holes 103, attachment bolts 104 and attachment thread holes 506. Prismatic slider attachment face 509 secures to back structural face 201 of bodiless instrument structure 200 by means of attachment through holes 508, attachment thread holes 203 and attachment bolts 204. As illustrated, prismatic slider 507 slip fits within prismatic channel 503, projects partially above angular face 502 and is positionally secured by set screw 512. Prismatic channel 503 is machined within angular face 502 and follows a cut line that is angular in relation to the sides of prismatic linkage block 501 thereby providing for the horizontal, vertical and angular pitch, bank and yaw positioning of fingerboard 3R relative to 3L. This linkage provides the player with the means for preferably positioning the latitudinal relationship of the widths of fingerboards 3R and 3L relative to each other while maintaining the overall preferred fingerboard dimensional relationship.

Figure 18:
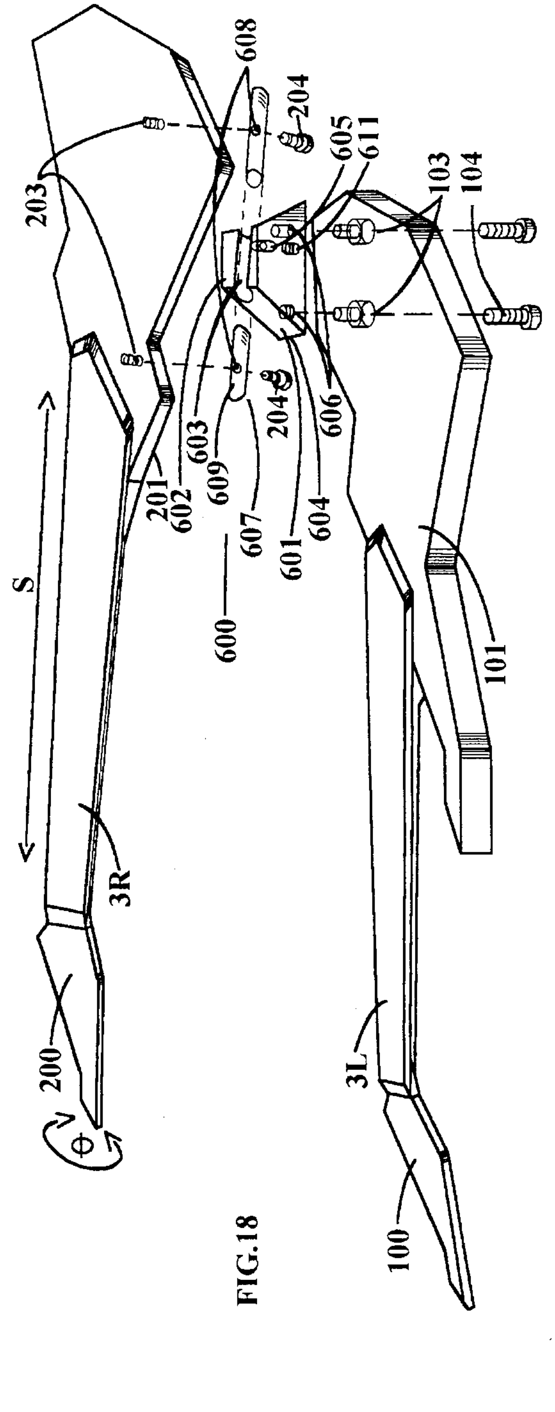
FIG. 18 illustrates in perspective explosion a player supported version of the present invention that uses a cylindrical linkage to horizontally, vertically and angularly position instrument fingerboards relative to each other and provide for the variable latitudinal and bank angle positioning of instrument fingerboards.

Cylindrical linkage 600 shown in FIG. 18 illustrates cylindrical linkage block 601 that includes angular face 602, partial cylindrical channel 603, attachment face 604, set screw thread hole 605 and attachment thread holes 606, rod 607 with attachment through holes 608 and attachment surface 609, rod attachment bolts 610 and set screw 611. Attachment face 604 of cylindrical linkage block 601 is secured to front structural face 101 of bodied instrument structure by means of through holes 103, attachment bolts 104 and attachment thread holes 606. Rod attachment surface 609 secures to back structural face 201 of bodiless instrument structure 200 by means of attachment through holes 608, attachment thread holes 203 and attachment bolts 204. Cylindrical channel 603 is machined within angular face 602 and follows a drill line that is angular in relation to the sides of cylindrical linkage block 601 thereby providing for the horizontal, vertical and angular positioning of fingerboard 3R relative to 3L. This linkage provides the player with the means for preferably positioning the latitudinal and bank angle relationship of fingerboards 3R and 3L relative to each other.

Figure 19:
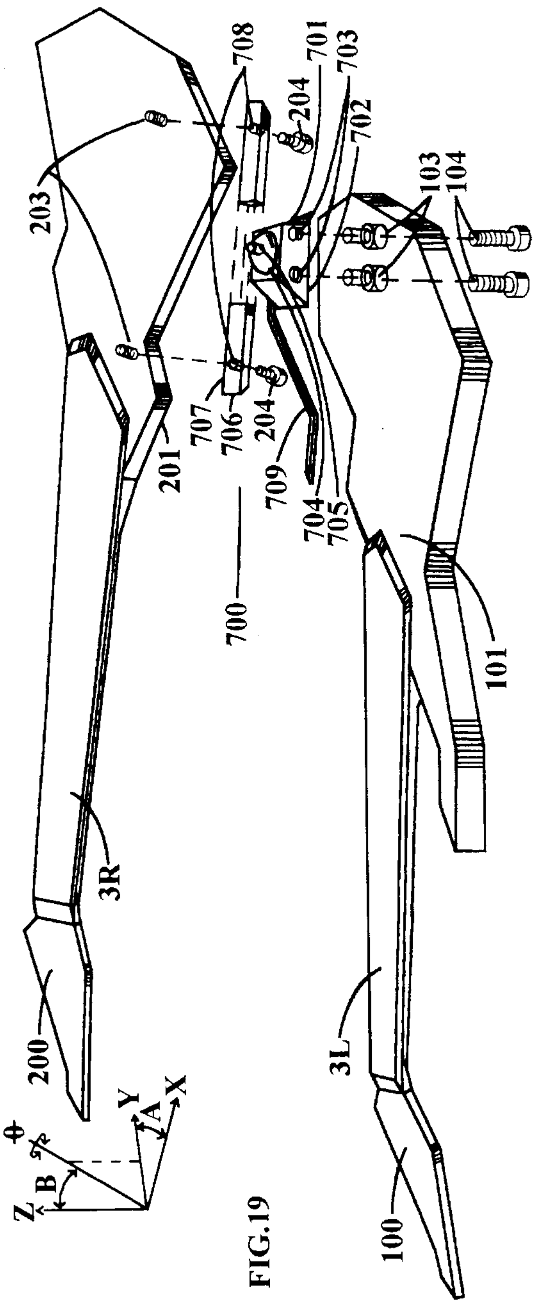
FIG. 19 illustrates in perspective explosion a player supported version of the present invention that uses a spherical linkage to horizontally, vertically and angularly position instrument fingerboards relative to each other and provide for the variable angular pitch, bank and yaw positioning of instrument fingerboards.

The illustration of FIG. 19 shows bodied instrument structure 100 and bodiless instrument structure 200 attached together by means of spherical linkage 700. Spherical linkage 700 includes housing 701 with attachment face 702 that includes attachment thread holes 703, spherical positioner 704, shaft projection 705, attachment plate 706 with attachment face 707 and attachment through holes 708, lever arm 709 and attachment bolts 710. Securability to bodied instrument structure 100 is provided by through holes 103, attachment bolts 104 and attachment thread holes 703. Securability to bodiless instrument structure 200 is provided by means of attachment bolts 709, attachment through holes 708, attachment bolts 204 and attachment thread holes 203 located on back structural face 201. Spherical positioner 704, shaft projection 705 and attachment plate 706 are rigidly connected for linkage stability. This linkage provides the means for adjustable pitch, bank and yaw angular positioning of fingerboards 3R and 3L relative to each other with securability of linkage positioning being provided by lever arm 709 which correspondingly controls the locking mechanism of the linkage. The longitudinal and latitudinal positioning of fingerboards 3R and 3L relative to each other is determined by the position of through holes 103 and 203. Be it noted that reference to shaft projection 705 is meant to include all viable means for connecting spherical positioner 704 with attachment plate 706 and that spherical linkage 700 is a general reference due to the wide variety of devices available on the market.

Figure 20:
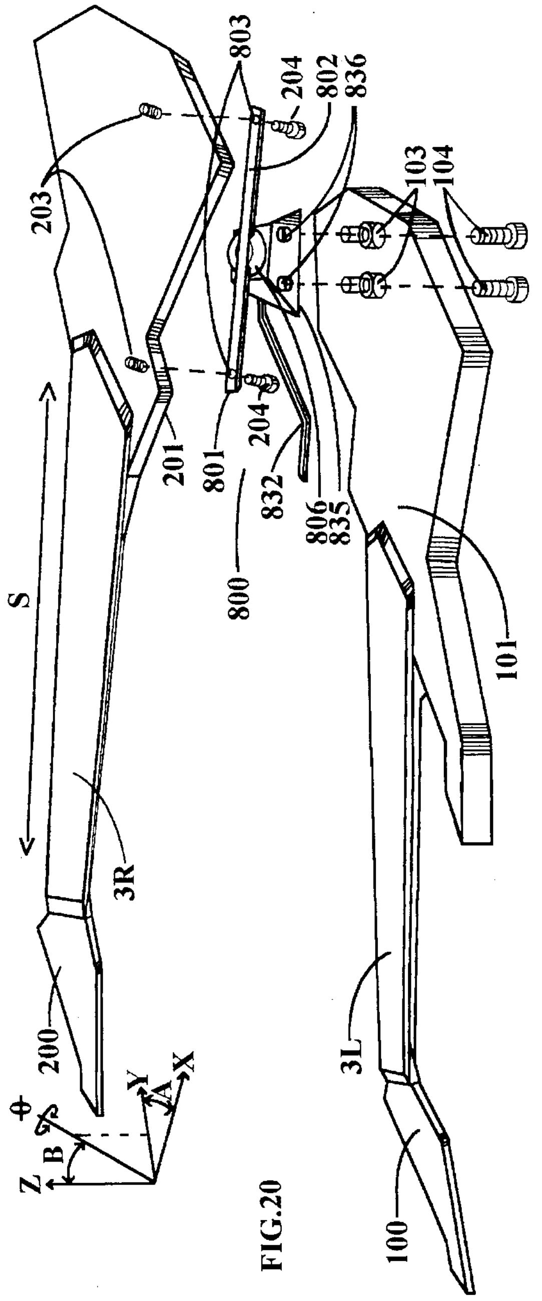
FIG. 20 illustrates in perspective explosion a player supported version of the present invention that uses a novel combination spherical-prismatic linkage to horizontally, vertically and angularly position instrument fingerboards relative to each other and provide for the variable latitudinal and angular pitch, bank and yaw positioning of instrument fingerboards.
Figure 21:
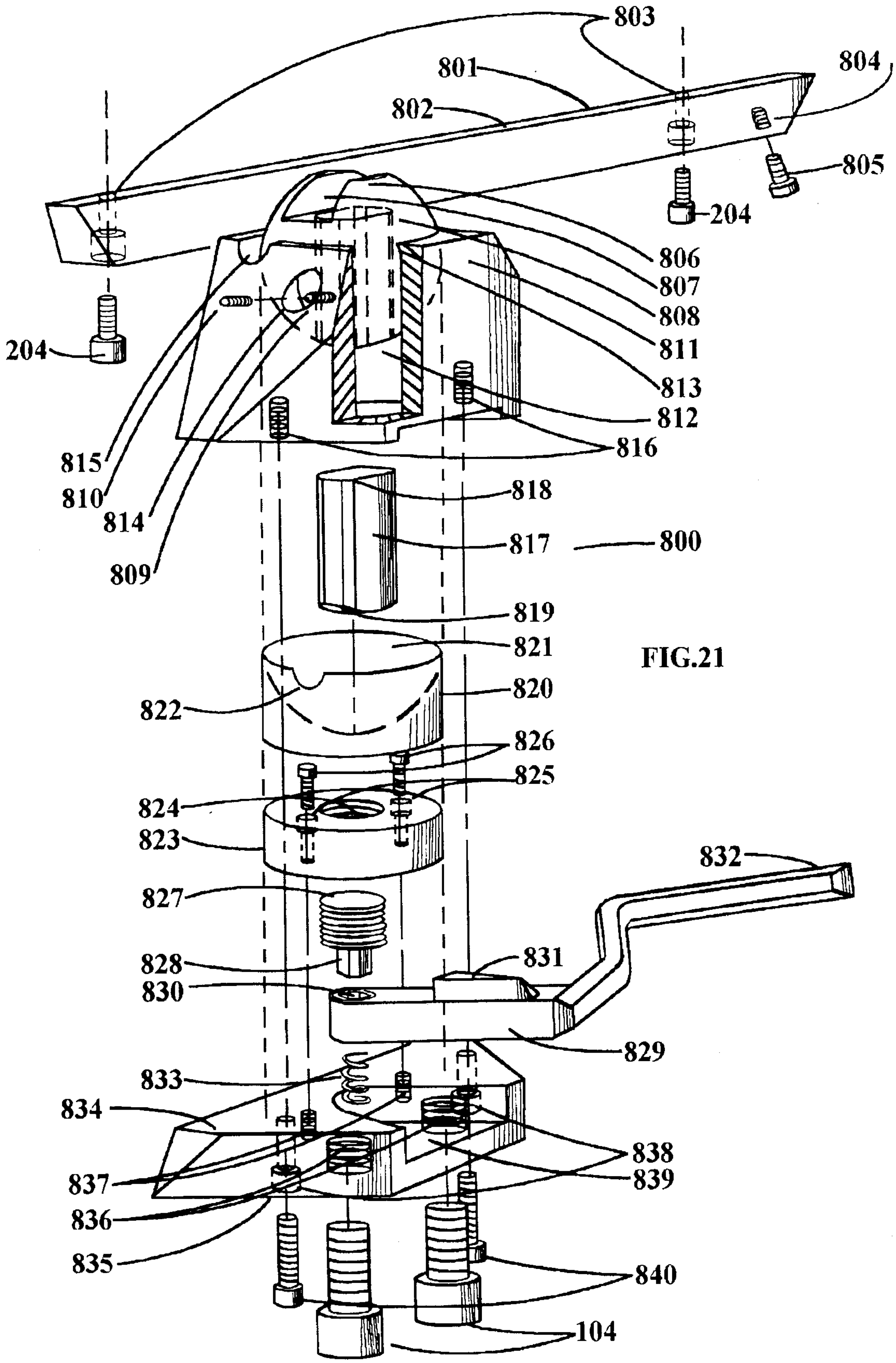
FIG. 21 illustrates in perspective explosion the novel combination spherical-prismatic linkage of the player supported version of the present invention.

FIGS. 20 and 21 illustrate the most preferred linkage for the player supported version of the present invention. Spherical-prismatic linkage 800 effectively combines a spherical linkage with a prismatic linkage and provides a common locking means for positional securability. Spherical-prismatic linkage 800 vertically displaces bodiless instrument structure 200 above bodied instrument structure 100 and enables the player to adjust the latitudinal and angular pitch, bank and yaw positioning of Fingerboards 3R and 3L relative to each other.

As shown in exploded detail by FIG. 21, spherical prismatic linkage 800 includes prismatic slider 801 with attachment face 802 attachment through holes 803 and thread hole 804, shoulder bolt 805, spherical positioner 806 with prismatic channel 807, locking wedge channel 808 and thread hole 809, positional limitation set screw 810, housing 811 with circular bore 812, retaining lip 813, limitation hole 814, channel 815 and housing thread holes 816, locking wedge 817 with prismatic securing face 818 and spherical securing face 819, locking cup 820 with spherical bore 821 and circular notch 822, cylindrical locking plate 823 with thread hole 824 and attachment through holes 825, cylindrical locking plate attachment bolts 826, locking set screw 827 with hex projection 828, ratchet 829 with ratchet hex channel 830, direction control lever 831 and lever arm 832, spring 833, housing plate 834 with attachment face 835, attachment thread holes 836, cylindrical locking plate thread holes 837, housing through holes 838 and ratchet basin 839 and housing plate attachment bolts 840.

With assembly, spherical positioner 806 slip fits within circular bore 812, projects above the top surface of housing 811 and is positionally limited by retaining lip 813. Locking cup 820 slip fits within circular bore 812 behind spherical positioner 806. Hex projection 828 of locking set screw 827 slip fits within ratchet hex channel 830 of ratchet 829. Locking set screw 827 secures within thread hole 824 of cylindrical locking plate 823. Cylindrical locking plate 823 removably secures to housing plate 834 by means of attachment through holes 825, cylindrical locking plate thread holes 837 and locking plate attachment bolts 826 and slip fits within circular bore 812. Ratchet basin 834 provides clearance for ratchet 829. Spring 833 is positioned between the bottom of ratchet basin 834 and hex projection 828 as a means for supplying resistance between locking set screw 827 and thread hole 824. Housing plate 834 removably secures to housing 811 by means of housing thread holes 816, housing through holes 838 and housing plate attachment bolts 840. Locking wedge 817 slip fits within locking wedge channel 808 and prismatic slider 801 slip fits within prismatic channel 807 and is limited in motion by shoulder bolt 805 to eliminate accidental damage. Positional limitation set screw 810 secures within thread hole 809 and projects above the surface of spherical positioner 806. The range of motion of positional limitation set screw 810 and therefore spherical positioner 806 is determined by limitation hole 814 and provides additional protection against accidental damage. Circular notch 822 provides clearance for positional limitation set screw 810 relative to limitation hole 814 when assembled. Channel 815 provides additional clearance for prismatic slider 801 for an increase in angular positioning capabilities. Securability of attachment face 802 to bodied instrument structure 100 is by means of through holes 103, attachment bolts 104 and attachment thread holes 836. Securability of attachment face 802 to bodiless instrument structure is by means of attachment through holes 803, attachment thread holes 203 and attachment bolts 204.

Control of positional securability of spherical-prismatic linkage 800 is provided by ratchet 829. When unlocked, spherical positioner 806 and prismatic slider 801 freely move providing the player with the means for adjusting the dimensional positioning of fingerboards 3R and 3L relative to each other. When the fingerboards are correctly positioned, the player positions direction control lever 831 for free clockwise rotation of ratchet hex channel 830. By rotating ratchet 829 counterclockwise by means of lever arm 832, ratchet hex channel 830 rotates hex projection 828 of locking set screw 827 clockwise. Locking set screw 827 correspondingly rotates clockwise within thread hole 824 of cylindrical locking plate 823 and positions locking cup 820 towards retaining lip 813. When prismatic securing face 818 secures against prismatic slider 801, locking wedge 817 is dimensioned so that spherical securing face 819 will project partially above the surface of spherical positioner 806. With this, spherical positioner 806 is positioned above spherical bore 821 of locking cup 820 by means of locking wedge 817. As locking cup 820 is positioned towards retaining lip 813, the projection of spherical securing face 819 above the surface of spherical positioner 806 provides the means of securing the position of prismatic slider 801 within prismatic channel 807 and the position of spherical positioner 806 against retaining lip 813 simultaneously. As illustrated, locking wedge channel 808 is through cut and perpendicular to prismatic channel 807. Linkage rigidity depends upon the force applied to lever arm 832 after surface contact between all movable components is established. To unlock the mechanism, the player simply positions direction control lever 831 for free counterclockwise rotation and rotates lever arm 832 clockwise. This linkage provides the player with the means for easily adjusting and securing fingerboards 3R and 3L into the most beneficial position for technique engagement and comfort.

While common spherical linkages are capable of being combined with a prismatic linkage through the usage of such attachment methods as shafts, plates, bolts and welding as a way of creating a combination spherical-prismatic linkage, this type of linkage structure is not preferred with the player supported versions of the present invention because it requires the player to adjust and lock the positioning of the spherical linkage and the prismatic linkage separately. The capability of simultaneous adjustment and locking of a combination spherical-prismatic linkage has proven to be most beneficial in practice in regards to this version of the present invention.

The structural feel of these player supported versions of the present invention against the body is similar to that of a standard single fingerboard electric guitar. The vertical displacement of bodiless instrument structure 200 above bodied instrument structure 100 has proven to be very beneficial. This structural design format eliminates the usage of an oversized body member common to both fingerboards. This, in combination with the horizontal, vertical and angular pitch, bank and yaw dimensional positioning of the present invention's fingerboards for optimal technique engagement, provides for an instrument structure with multiple fingerboards that is compact, highly mobile and very comfortable to play.

Figure 24:
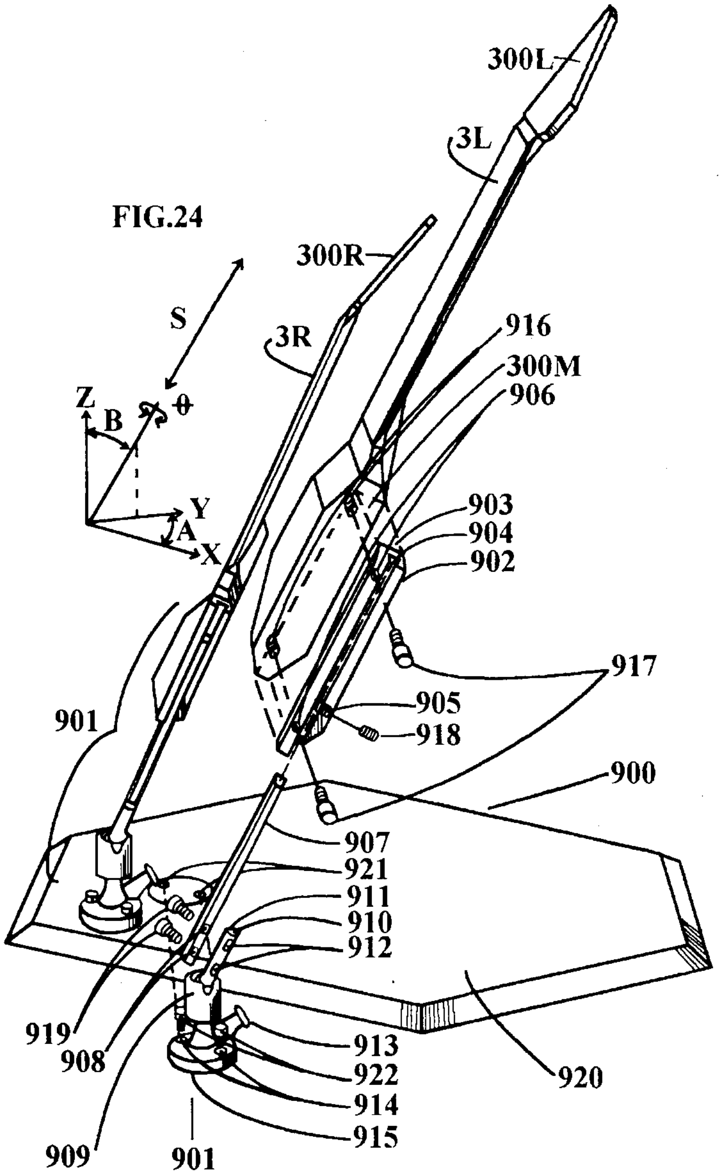
FIG. 24 illustrates in perspective a structurally supported version of the present invention that uses a novel combination spherical-prismatic linkage that horizontally, vertically and angularly positions instrument fingerboards relative to each other and provides for the variable latitudinal and angular pitch, bank and yaw positioning of instrument fingerboards and shows in explosion one spherical-prismatic component of the composite linkage.

The usage of a linkage that provides structural support is preferred when single fingerboard instrument structures with large size and/or high mass are used. With the structurally supported version of the present invention, bodiless instrument structures are preferably used. FIGS. 22 and 23 illustrate front and back views respectively of bodiless instrument structure 300 and for simplicity, illustrates the preferred positioning of manual override controllers 22R and 22L on the same structure. The spherical-prismatic linkage 900 illustrated in FIG. 24 structurally supports bodiless instrument structure 300R and bodiless instrument structure 300L and provides for the dimensional positioning of fingerboards 3R and 3L relative to each other for an improvement in technique engagement and player comfort. As illustrated, spherical-prismatic linkage 900 attaches a first spherical-prismatic linkage 901 to bodiless instrument structure 300R and a second spherical-prismatic linkage 901 to bodiless instrument structure 300L and secures each spherical-prismatic linkage 901 to base 920 thus forming a composite linkage.

Each spherical-prismatic linkage 901 includes prismatic slider plate 902 with attachment face 903, prismatic channel 904, set screw thread hole 905 and attachment through holes 906, prismatic slider 907 with attachment through holes 908, spherical linkage 909 with shaft projection 910, shaft flat 911 with thread holes 912, locking knob 913, attachment through holes 914 and attachment face 915. A Wilton PowrArm, model 303 is a preferred stock component for spherical linkage 909.

For assembly, attachment face 903 of prismatic slider plate 902 secures to mounting surface 300M by means of attachment through holes 906, attachment thread holes 916 and attachment bolts 917. Prismatic slider 907 slip fits within prismatic channel 904 with linear positional securability of prismatic slider plate 902 relative to prismatic slider 907 being provided by means of set screw 918 and set screw thread hole 905. Prismatic slider 907 secures to shaft flat 911 by means of attachment through holes 908, attachment thread holes 912 and attachment bolts 919. Attachment face 915 of spherical linkage 909 secures to base 920 by means of attachment through holes 914, attachment thread holes 921 of base 920 and attachment bolts 922.

This linkage format provides the player with variable radius/semi-spherical dimensional positioning of each instrument structure relative to the floor. The spherical component of this linkage determines the horizontal, vertical and angular pitch, bank and yaw positioning of the instrument structure relative to the floor. The variable radius dimensional positioning provided by the prismatic component of this linkage enables a player to adjust the latitudinal position of each instrument structure when the spherical component is preferably positioned. This provides for seated and standing engagement with the fingerboards beneficially positioned. This has proven to be a most advantageous variation of the present invention.

Figure 25:
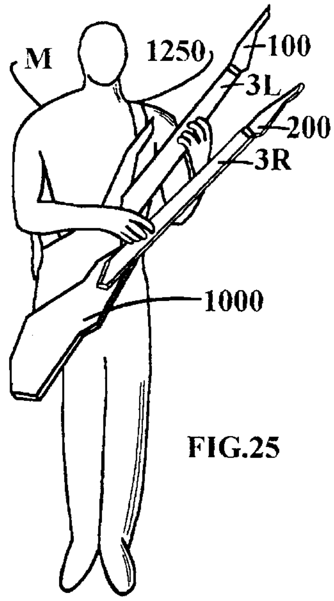
FIG. 25 is a perspective illustration of the player supported version of the present invention and shows the preferred dimensional positioning of instrument fingerboards.
Figure 26:
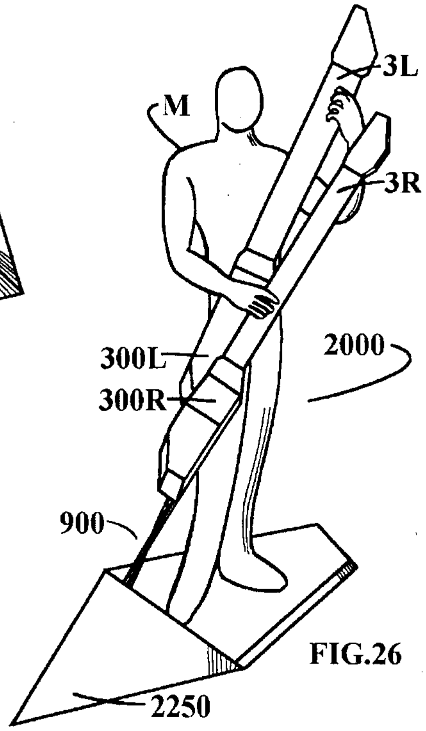
FIG. 26 is a perspective illustration of the structurally supported version of the present invention and shows the preferred dimensional positioning of instrument fingerboards.

FIGS. 25 and 26 illustrate the preferred dimensional positioning of fingerboards 3R and 3L relative to each other for optimum technique and player comfort in the above described player and structurally supported versions of the present invention, respectively. The perspective front view of player supported multiple fingerboard instrument structure 1000 in FIG. 21 illustrates musician M, strap supporting means 1250 and represents the integration of bodied instrument structure 100 with bodiless instrument structure 200 by means of any of the above described linkages for the player supported versions of the present invention. Structurally supported multiple fingerboard instrument structure 2000 in FIG. 26 illustrates the integration of bodiless instrument structure 300R with bodiless instrument structure 300L by means of spherical-prismatic linkage 900 as described above, shows fingerboards 3R and 3L positioned for standing engagement by musician M and includes a means for improving the visual aesthetics of the instrument in the form of cover shell 2250.

With the preferred fingerboard dimensional positioning of the present invention as illustrated above, the engaging faces of fingerboards 3R and 3L substantially face the same forward oriented direction and are vertically offset relative to each other, the widths of fingerboards 3R and 3L are offset latitudinally relative to each other, the lengths of fingerboards 3R and 3L are offset longitudinally relative to each other and the engaging faces of fingerboards 3R and 3L are offset angularly relative to each other. It has been found all of the most preferred dimensional positionings for all versions of the present invention exist within a pitch range of 1.5 to 15 degrees, a left bank range of 15 to 37.5 degrees, a yaw range of 1.5 to 5 degrees, a longitudinal offset range of 0 to 7 inches, a latitudinal offset range of 0 to 12 inches and a vertical displacement range of 1.5 to 7 inches of fingerboard 3R relative to fingerboard 3L.

While the illustrative embodiments described above are a variety of examples of the present invention, they are not to be construed as limitations on the scope of the present invention or on the types of technologies, linkages and devices capable of being integrated with the present invention. Modifications and variations of the present invention in regards to the linkages, fingerboard technologies and applications of the present invention may become apparent to those with skill in the art and accordingly, the fundamental spirit of the present invention exists within the following appended claims.

I claim:

1. In combination:

a first musical instrument having a first fingerboard;

a second musical instrument having a second fingerboard;

a linkage means for attaching said first instrument to said second instrument comprising:

a block having a first attachment face defining a first plane and a second attachment face, opposite said first attachment face, defining a second plane; wherein, the second plane is angularly disposed relative to the first plane;

the first attachment face fixedly attached to said first instrument; and means for attaching said second attachment face to said second instrument.

2. The combination of claim 1, wherein said attachment means comprises:

a slider channel formed in said second attachment face:

a slider fixedly attached to said second instrument and slip fitted in said channel; and a locking means for fixedly positioning said slider in said slider channel.

3. The combination of claim 2 wherein said slider and said channel are substantially cylindrical in shape.

4. The combination of claim 1 wherein said first instrument is bodied and said second instrument is bodiless.

5. In combination:

a first musical instrument having a first fingerboard;

a second musical instrument having a second fingerboard;

a linkage means for attaching said first instrument to said second instrument comprising:

a block having a first attachment face and a second attachment face opposite said first attachment face;

said first attachment face fixedly secured to said first instrument; and, spherical means for attaching said second attachment face to said second instrument.

6. The combination of claim 5 wherein, said spherical attachment means comprising:

a circular bore in said second attachment face;

a spherical positioner slip fitted into said bore;

a plate having a first face and a second face opposite said first face; and, said first face fixedly attached to said second instrument and said second face fixedly attached to said spherical positioner.

7. The combination of claim 5 wherein, said spherical attachment means comprising:

a circular bore in said second attachment face;

a spherical positioner slip fitted into said bore;

a slider channel formed in said spherical positioner;

a slider slip fitted in said channel;

a locking means for fixedly positioning said spherical positioner in said circular bore and said slider within said slider channel; and said slider fixedly attached to said second instrument.

8. The combination of claim 5 wherein said first instrument is bodied and said second instrument is bodiless.

* * * * *